United States Patent
Agosti et al.

(10) Patent No.: US 12,031,643 B2
(45) Date of Patent: Jul. 9, 2024

(54) BALL VALVE ASSEMBLY

(71) Applicant: Cameron International Corporation, Houston, TX (US)

(72) Inventors: Diego Agosti, Voghera (IT); Federico Ricotti, Voghera (IT)

(73) Assignee: CAMERON INTERNATIONAL CORPORATION, Houston, TX (US)

(*) Notice: Subject to any disclaimer, the term of this patent is extended or adjusted under 35 U.S.C. 154(b) by 183 days.

(21) Appl. No.: 17/759,565

(22) PCT Filed: Feb. 2, 2021

(86) PCT No.: PCT/US2021/016178
§ 371 (c)(1),
(2) Date: Jul. 27, 2022

(87) PCT Pub. No.: WO2021/158524
PCT Pub. Date: Aug. 12, 2021

(65) Prior Publication Data
US 2023/0250887 A1    Aug. 10, 2023

(30) Foreign Application Priority Data
Feb. 3, 2020   (EP) ..................................... 20425005

(51) Int. Cl.
*F16K 5/20* (2006.01)
*F16K 5/06* (2006.01)
*F16K 27/06* (2006.01)

(52) U.S. Cl.
CPC ............ *F16K 5/201* (2013.01); *F16K 5/0605* (2013.01); *F16K 27/067* (2013.01); *F16K 5/0689* (2013.01)

(58) Field of Classification Search
CPC ........ F16K 27/067; F16K 5/0689; F16K 5/20; F16K 5/201
See application file for complete search history.

(56) References Cited

U.S. PATENT DOCUMENTS 2,863,629 A * 12/1958 Knox ...................... F16K 5/201
251/188
3,254,873 A   6/1966 Knox
(Continued)

FOREIGN PATENT DOCUMENTS

CN    206655981 U    11/2017
JP    47026020 U    11/1972
(Continued)

OTHER PUBLICATIONS

International Search Report and Written Opinion issued in PCT application PCT/US2021/016178, dated May 21, 2021 (10 pages).
(Continued)

*Primary Examiner* — Atif H Chaudry
(74) *Attorney, Agent, or Firm* — Jeffrey D. Frantz

(57) ABSTRACT

A ball valve assembly includes a ball configured to rotate between an open position and a closed position. The ball valve assembly also includes an annular seat configured to engage the ball and a rotatable ring having a first engagement feature. In addition, the ball valve assembly includes a non-rotatable ring positioned adjacent to the rotatable ring. The ball valve assembly also includes a drive plate non-rotatably coupled to the ball. The drive plate includes a second engagement feature, and the second engagement feature is configured to engage the first engagement feature to drive the rotatable ring to rotate in response to rotation of the drive plate. Furthermore, the ball valve assembly includes a bearing element configured to drive the rotatable ring and the non-rotatable ring away from one another to compress the annular seat against the ball in response to rotation of the rotatable ring.

17 Claims, 8 Drawing Sheets

(56) References Cited

U.S. PATENT DOCUMENTS

| | | | | |
|---|---|---|---|---|
| 5,004,005 A | * | 4/1991 | Graves | F16K 5/0605 |
| | | | | 251/192 |
| 5,549,275 A | * | 8/1996 | Knox | F16K 5/201 |
| | | | | 251/188 |
| 5,676,347 A | | 10/1997 | Knox | |

FOREIGN PATENT DOCUMENTS

| | | | |
|---|---|---|---|
| JP | 10132099 A | 5/1998 | |
| JP | 11351420 A | 12/1999 | |

OTHER PUBLICATIONS

Grove, BT1 & BT2 Top Entry Ball Valves, downloaded on Sep. 6, 2022 (32 pages).
Extended Search issued in European Patent Application No. 21750235.0 dated Mar. 14, 2024, 6 pages.

\* cited by examiner

BALL VALVE ASSEMBLY

CROSS REFERENCE TO RELATED APPLICATION

This application is a National Stage Entry of International Application No. PCT/US2021/016178, filed Feb. 2, 2021, which claims priority from and the benefit of EP Patent Application No. 20425005.4, entitled "MECHANICAL THRUST BALL VALVE", filed Feb. 3, 2020, which is hereby incorporated by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. In various subsea applications and other well applications, ball valve assemblies are used to control fluid flow through a well string. Ball valve assemblies include a ball having a fluid pathway extending through the ball. While the ball valve assembly is in an open state (e.g., open position of the ball), the fluid pathway of the ball is aligned with a fluid passage of the ball valve assembly, thereby enabling fluid to flow through the ball valve assembly. In addition, while the ball valve assembly is in a closed state (e.g., closed position of the ball), the fluid pathway of the ball is oriented generally perpendicularly to the fluid passage of the ball valve assembly, thereby blocking fluid flow through the ball valve assembly.

In certain ball valve assemblies, fluid pressure is used to drive annular seats against the ball to substantially block fluid flow through the fluid passage while the ball is in the closed position and to substantially block fluid from flowing out of the fluid passage/fluid pathway interface while the ball is in the open position. For example, an annular seat may be positioned adjacent to each end of the ball. A ring (e.g., driver, piston, etc.) may be positioned adjacent to each annular seat on an opposite side of the annular seat from the ball. Fluid pressure within the fluid passage may drive the ring to compress the annular seat against the ball. Unfortunately, under operational conditions (e.g., fluid pressures, fluid flow rates, etc.) associated with certain applications, the fluid pressure may not provide a sufficient force to the rings to establish effective seals between the annular seats and the ball. Accordingly, a ball valve assembly, in which the annular seats are compressed against the ball by application of fluid pressure, may not be utilized for such applications.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
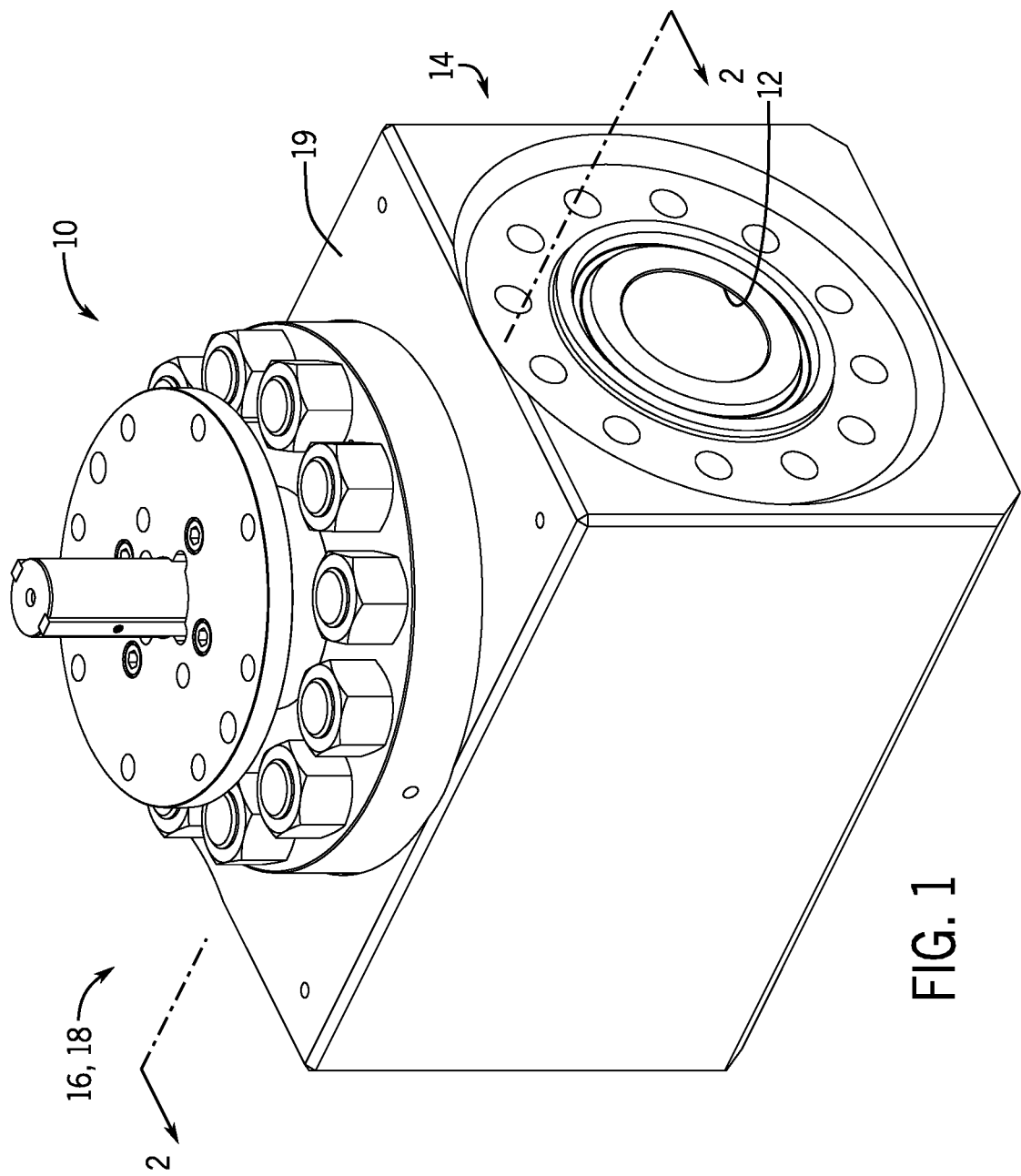
FIG. 1 is a perspective view of an embodiment of a ball valve assembly.

FIG. 1 is a perspective view of an embodiment of a ball valve assembly 10. In certain embodiments, the ball valve assembly 10 may be disposed along a well string, such as a landing string. For example, the ball valve assembly 10 may be used as a retainer valve within a subsea landing string. In the illustrated embodiment, the ball valve assembly 10 includes an inlet 12 positioned at a first end portion 14 of the ball valve assembly 10, and the ball valve assembly 10 includes an outlet 16 positioned at a second end portion 18 of the ball valve assembly 10. The inlet 12 is configured to receive fluid (e.g., from a well), and the ball valve assembly 10 is configured to control flow of the fluid through the ball valve assembly 10 between the inlet 12 and the outlet 16. Furthermore, the ball valve assembly 10 includes a housing 19 (e.g., body) configured to house a ball. The housing 19 may be a solid forged block of material (e.g., steel), as illustrated, the housing may be cast from a suitable material (e.g., steel), or the housing may be formed by another suitable technique. In addition, the housing may be formed from a single piece of material, or the housing may be formed from multiple pieces of material coupled to one another.

As discussed in detail below, in certain embodiments, the ball of the ball valve assembly 10 has a fluid pathway extending through the ball. The ball is configured to rotate between an open position and a closed position. The fluid pathway is configured to align with a fluid passage of the ball valve assembly 10 while the ball is in the open position to enable fluid flow through the ball valve assembly 10. In addition, the fluid pathway is configured to be offset from the fluid passage while the ball is in the closed position to block fluid flow through the ball valve assembly 10. Furthermore, the ball valve assembly includes an annular seat configured to engage the ball. The ball valve assembly also includes a rotatable ring positioned on an opposite side of the annular seat from the ball, and the rotatable ring includes a first engagement feature (e.g., substantially flat surface). In addition, the ball valve assembly includes a non-rotatable ring positioned adjacent to the rotatable ring (e.g., on an opposite side of the rotatable ring from the annular seat). The ball valve also includes a drive plate non-rotatably coupled to the ball. Accordingly, the drive plate is configured to rotate with the ball between the open and closed positions. The drive plate includes a second engagement feature (e.g., substantially flat surface), and the second engagement feature of the drive plate is configured to engage the first engagement feature of the rotatable ring to drive the rotatable ring to rotate in response to rotation of the drive plate. Furthermore, the ball valve assembly includes bearing element(s) (e.g., spherical head pin(s), etc.) configured to drive the rotatable ring and the non-rotatable ring away from one another to compress the annular seat against the ball in response to rotation of the rotatable ring.

By way of example, as the ball rotates toward the open position, the drive plate, which is non-rotatably coupled to the ball, rotates with the ball. As the ball approaches the open position, the second engagement feature of the drive plate engages the first engagement feature of the rotatable ring. Further rotation of the ball causes the drive plate to drive the rotatable ring to rotate via engagement of the first and second engagement features. Rotation of the rotatable ring causes the bearing element(s) to drive the rotatable ring and the non-rotatable ring away from one another, thereby compressing the annular seat against the ball. Alternatively, as the ball rotates toward the closed position, the drive plate, which is non-rotatably coupled to the ball, rotates with the ball. As the ball approaches the closed position, the second engagement feature of the drive plate engages the first engagement feature of the rotatable ring. Further rotation of the ball causes the drive plate to drive the rotatable ring to rotate via engagement of the first and second engagement features. Rotation of the rotatable ring causes the bearing element(s) to drive the rotatable ring and the non-rotatable ring away from one another, thereby compressing the annular seat against the ball. Accordingly, as the ball rotates to the open position or to the closed position, the annular seat is compressed against the ball by mechanical force applied by the drive plate, the rotatable ring, and the bearing element(s) (e.g., alone or in combination with a force applied by pressurized fluid within the ball valve assembly, as discussed in detail below). As a result, the annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seat is compressed against the ball by application of fluid pressure alone.

Figure 2:
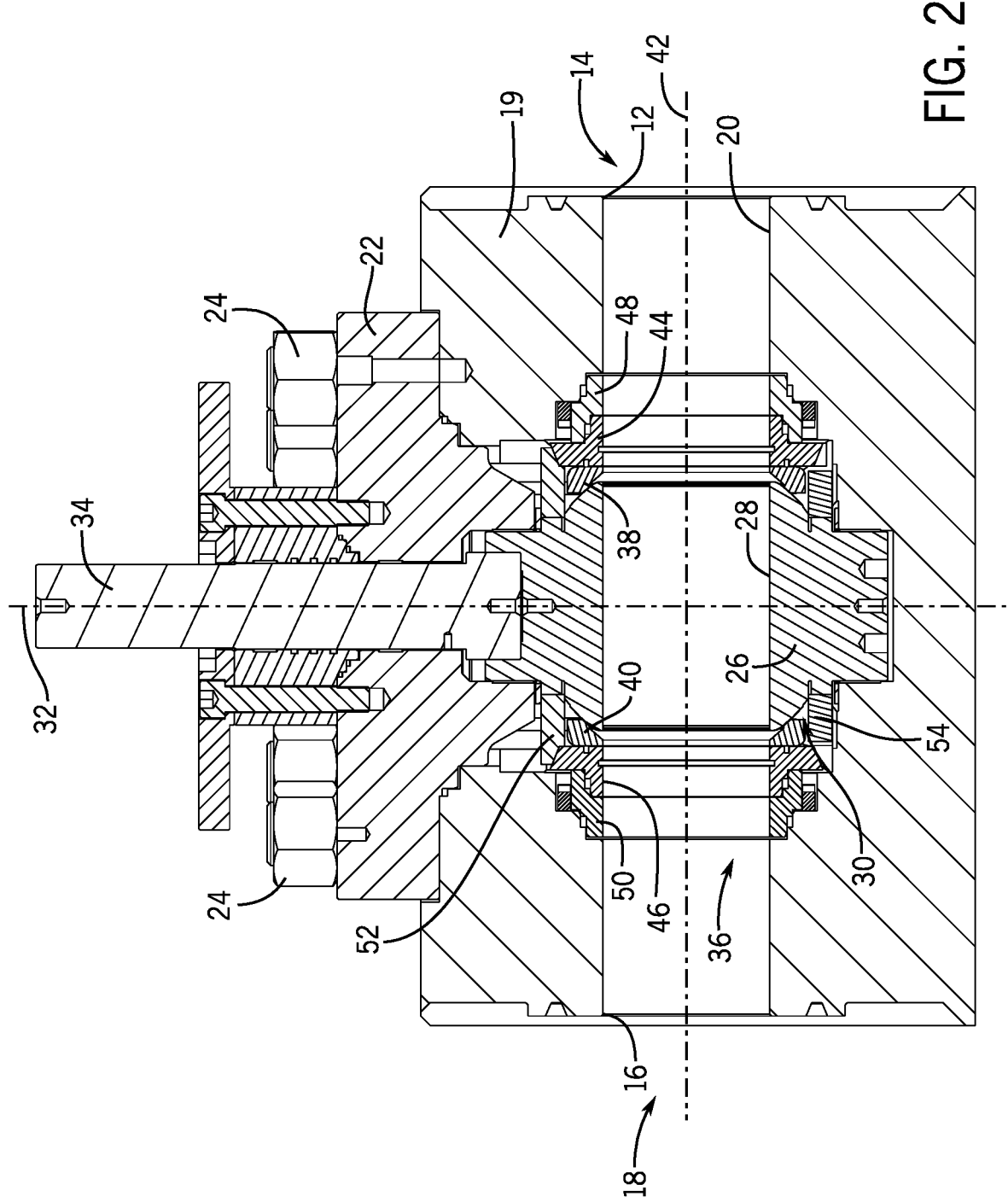
FIG. 2 is a cross-sectional view of the ball valve assembly of FIG. 1, taken along line 2-2 of FIG. 1.

FIG. 2 is a cross-sectional view of the ball valve assembly 10 of FIG. 1, taken along line 2-2 of FIG. 1. In the illustrated embodiment, the housing 19 (e.g., body) of the ball valve assembly 10 has a fluid passage 20. As illustrated, the fluid passage 20 extends to the inlet 12 and to the outlet 16. The ball valve assembly 10 also includes an adapter 22 (e.g., bonnet) coupled to the housing 19. In the illustrated embodiment, the adapter 22 is coupled to the housing 19 by fasteners 24, such as the illustrated bolts/nuts. However, in other embodiments, the adapter 22 may be coupled to the housing 19 by any other suitable type of connection or combination of connections (e.g., alone or in combination with the fasteners 24). Furthermore, the ball valve assembly 10 includes a ball 26 disposed within the housing 19 and having a fluid pathway 28. As illustrated, the ball 26 is retained within an internal cavity 30 of the housing 19 by the adapter 22. The ball 26 is configured to rotate about a rotational axis 32 between an open position and a closed position. The fluid pathway 28 of the ball 26 is configured to align with the fluid passage 20 of the housing 19 while the ball 26 is in the open position to enable fluid flow through the fluid passage 20. In addition, the fluid pathway 28 of the ball 26 is configured to be offset from the fluid passage 20 of the housing 19 while the ball 26 is in the closed position to substantially block fluid flow through the fluid passage 20. In the illustrated embodiment, a stem 34 extends through the adapter 22 and non-rotatably couples to the ball 26. Accordingly, rotation of the stem 34 about the rotational axis 32 drives the ball 26 to rotate between the open and closed positions. The stem 34 may be driven to rotate by manual input and/or by an actuator, such as a hydraulic actuator, an electromechanical actuator, a pneumatic actuator, another suitable type of actuator, or a combination thereof.

In the illustrated embodiment, the ball valve assembly 10 includes a sealing system 36 configured to substantially block fluid flow through the fluid passage 20 while the ball 26 is in the closed position and to substantially block fluid from flowing out of the fluid passage 20/fluid pathway 28 interface while the ball 26 is in the open position. The sealing system 36 includes a first seat, such as the illustrated first annular seat 38, and a second seat, such as the illustrated second annular seat 40. Each annular seat is configured to engage the ball 26. As discussed in detail below, each annular seat may be compressed against the ball (e.g., energized) while the ball is in the open position and/or while the ball is in the closed position. As illustrated, each annular seat is substantially aligned with the fluid passage 20 of the housing 19. Accordingly, each annular seat is substantially coaxial with the fluid passage 20 (e.g., the fluid passage 20 and each annular seat have a common longitudinal axis 42). Each annular seat may be formed from any suitable material or combination of materials, such as rubber, a polymeric material, metal, another suitable material, or a combination thereof. For example, at least one annular seat may include an annular polymeric seal disposed within a metal seal retainer. Furthermore, in certain embodiments, the annular seat may include a lip seal (e.g., including a coil spring extending circumferentially about the annular seat).

Furthermore, the sealing system 36 includes a first rotatable ring 44 and a second rotatable ring 46. As illustrated, the first rotatable ring 44 is positioned on an opposite side of the first annular seat 38 from the ball 26 along the longitudinal axis 42 of the fluid passage 20, and the second rotatable ring 46 is positioned on an opposite side of the second annular seat 40 from the ball 26 along the longitudinal axis 42 of the fluid passage 20. Each rotatable ring is configured to rotate about the longitudinal axis 42 of the fluid passage 20, and each rotatable ring includes one or more engagement features, as discussed in detail below. As illustrated, each rotatable ring is substantially aligned with the fluid passage 20 of the housing 19. Accordingly, each rotatable ring is substantially coaxial with the fluid passage 20 (e.g., the fluid passage 20 and each rotatable ring have a common longitudinal axis 42).

In addition, the sealing system 36 includes a first non-rotatable ring 48 and a second non-rotatable ring 50. As illustrated, the first non-rotatable ring 48 is positioned adjacent to the first rotatable ring 44 on an opposite side of the first rotatable ring 44 from the first annular seat 38 along the longitudinal axis 42 of the fluid passage 20, and the second non-rotatable ring 50 is positioned adjacent to the second rotatable ring 46 on an opposite side of the second rotatable ring 46 from the second annular seat 40 along the longitudinal axis 42 of the fluid passage 20. As discussed in detail below, rotation of each non-rotatable ring about the longitudinal axis 42 of the fluid passage 20 is blocked. As illustrated, each non-rotatable ring is substantially aligned with the fluid passage 20 of the housing 19. Accordingly, each non-rotatable ring is substantially coaxial with the fluid passage 20 (e.g., the fluid passage 20 and each non-rotatable ring have a common longitudinal axis 42).

The sealing system 36 of the ball valve assembly 10 also includes a first drive plate 52 non-rotatably coupled to the ball 26 and a second drive plate 54 non-rotatably coupled to the ball 26. Each drive plate is configured to rotate with the ball. For example, in certain embodiments, the ball may have polygonal protrusions, and each drive plate may have a corresponding polygonal recess configured to receive a respective polygonal protrusion of the ball. Engagement of each polygonal protrusion of the ball with the corresponding polygonal recess of the respective drive plate non-rotatably couples the respective drive plate to the ball. As discussed in detail below, each drive plate includes one or more engagement features, and each engagement feature of the drive plate is configured to engage a corresponding engagement feature of a respective rotatable ring (e.g., as the ball approaches the open position and/or the closed position). While an engagement feature of a drive plate is engage with a corresponding engagement feature of a rotatable ring, rotation of the drive plate drives the rotatable ring to rotate.

Furthermore, the sealing system 36 includes one or more first bearing elements and one or more second bearing elements. The first bearing element(s) are configured to drive the first rotatable ring 44 and the first non-rotatable ring 48 away from one another to compress (e.g., energize) the first annular seat 38 against the ball 26 in response to rotation of the first rotatable ring 44. In addition, the second bearing element(s) are configured to drive the second rotatable ring 46 and the second non-rotatable ring 50 away from one another to compress (e.g., energize) the second annular seat 40 against the ball 26 in response to rotation of the second rotatable ring 46. Accordingly, as the ball 26 rotates to the open position and/or to the closed position, each annular seat is compressed against the ball by mechanical force applied by the drive plates, the rotatable rings, and the bearing elements (e.g., alone or in combination with a force applied by pressurized fluid within the ball valve assembly, as discussed in detail below). As a result, each annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seats are compressed against the ball by application of fluid pressure alone.

Figure 3:
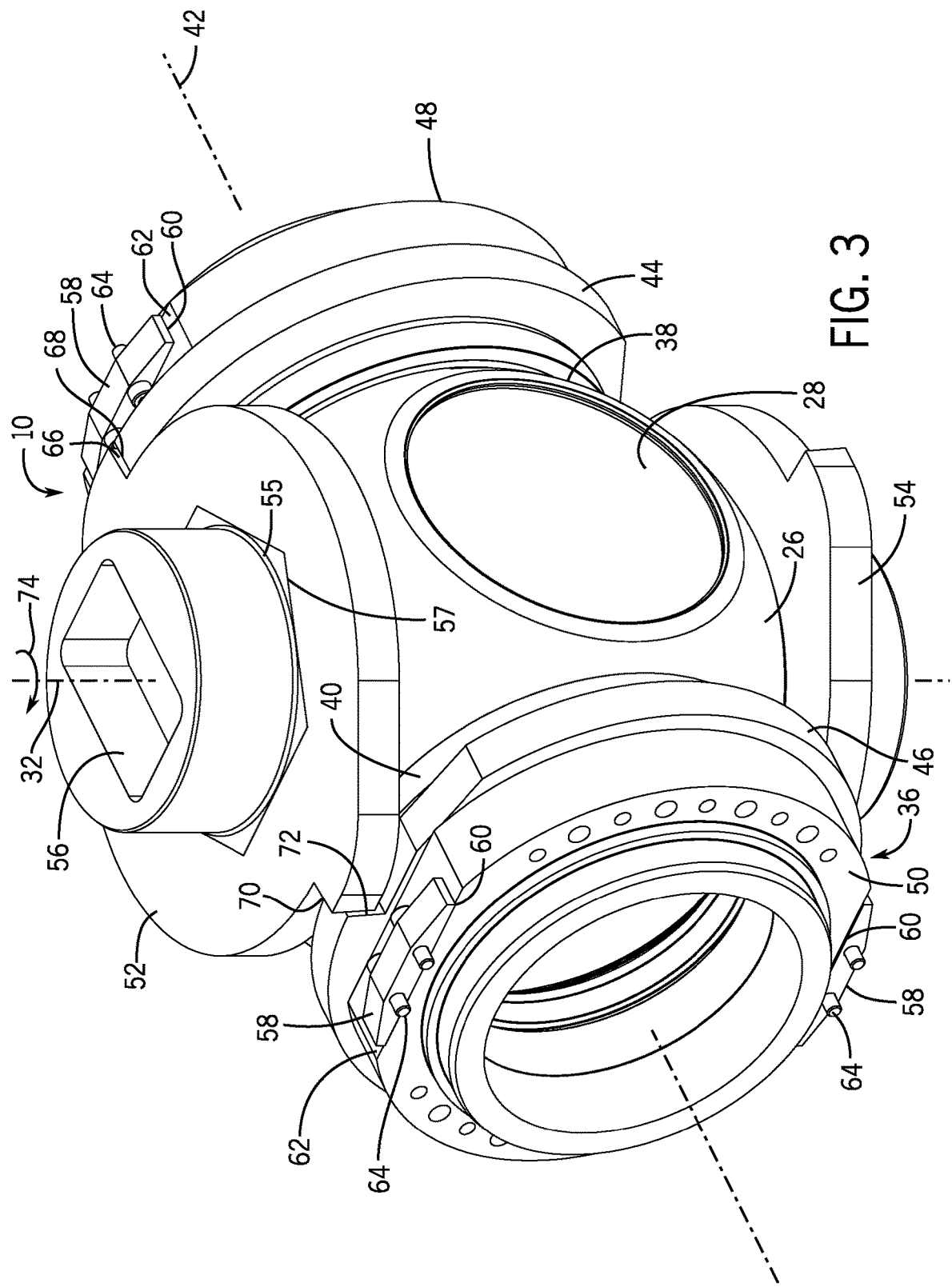
FIG. 3 is a perspective view of a ball and a sealing system of the ball valve assembly of FIG. 1, in which the ball is in a closed position.

FIG. 3 is a perspective view of the ball 26 and the sealing system 36 of the ball valve assembly 10 of FIG. 1, in which the ball 26 is in the closed position. In the illustrated embodiment, the ball 26 has a recess 56 configured to receive a corresponding protrusion of the stem. The recess 56 of the ball 26 and the protrusion of the stem are shaped to non-rotatably couple the stem to the ball 26 while the protrusion is engaged with the recess 56. In the illustrated embodiment, the recess 56 is substantially rectangular. However, in other embodiments, the recess may have any other suitable shape (e.g., elliptical, hexagonal, star-shaped, etc.). Furthermore, in certain embodiments, the stem and the ball may be non-rotatably coupled to one another by any other suitable connection (e.g., welded connection, pinned connection, integrally formed as one unit, etc.). Because the stem and the ball 26 are non-rotatably coupled to one another, rotation of the stem drives the ball 26 to rotate (e.g., between the illustrated closed position and the open position).

In the illustrated embodiment, the ball 26 includes a first polygonal protrusion 55, and the first drive plate 52 includes a corresponding polygonal recess 57 (e.g., opening) configured to receive the first polygonal protrusion 55 of the ball 26. Engagement of the first polygonal protrusion 55 of the ball 26 with the corresponding polygonal recess 57 of the first drive plate 52 non-rotatably couples the first drive plate 52 to the ball 26. While the first protrusion and the corresponding recess are polygonal in the illustrated embodiment, in other embodiments, the protrusion and the corresponding recess may have any other suitable shape (e.g., elliptical, star-shaped, etc.). Furthermore, in certain embodiments, the first drive plate may be non-rotatably coupled to the ball by another suitable connection (e.g., alone or in combination with the protrusion/recess connection), such as a fastener connection, a welded connection, an adhesive connection, other suitable connection(s), or a combination thereof. Furthermore, while the first drive plate is directly non-rotatably coupled to the ball in the illustrated embodiment, in other embodiments, the first drive plate may be non-rotatably coupled to the ball via another suitable structure, such as the stem.

In the illustrated embodiment, the sealing system 36 of the ball valve assembly 10 includes anti-rotation plates 58 configured to block rotation of the non-rotatable rings. As illustrated, each anti-rotation plate 58 has a substantially flat surface 60 (e.g., second substantially flat surface, fourth substantially flat surface), the first non-rotatable ring 48 has corresponding substantially flat surfaces 62 (e.g., first substantially flat surfaces), and the second non-rotatable ring 50 has corresponding substantially flat surface 62 (e.g., third substantially flat surfaces). The substantially flat surface 60 of each anti-rotation plate 58 is configured to contact a corresponding substantially flat surface 62 of a respective non-rotatable ring to block rotation of the non-rotatable ring about the longitudinal axis 42. While engagement of the substantially flat surfaces blocks rotation of the non-rotatable rings about the longitudinal axis 42, the substantially flat surfaces enable each non-rotatable ring to move along the longitudinal axis 42. As a result, the first rotatable ring and the first non-rotatable ring may move away from one another in response to rotation of the first rotatable ring, and the second rotatable ring and the second non-rotatable ring may move away from one another in response to rotation of the second rotatable ring. In the illustrated embodiment, each anti-rotation plate 58 is coupled to the housing by one or more fasteners 64. However, in other embodiments, at least one anti-rotation plate may be coupled to the housing by other suitable type(s) of connection(s) (e.g., alone or in combination with the fastener(s)), such as a welded connection, an adhesive connection, a press-fit connection, other suitable type(s) of connection(s), or a combination thereof. Furthermore, while two anti-rotation plates are used to block rotation of each non-rotatable ring in the illustrated embodiment, in other embodiments, more or fewer anti-rotation plates (e.g., 0, 1, 3, 4, or more) may be used to block rotation of at least one non-rotatable ring. For example, in certain embodiments, at least one substantially flat surface may be formed within the housing and configured to engage at least one corresponding substantially flat surface of at least one non-rotatable ring. Furthermore, while substantially flat surfaces are used to block rotation of each non-rotatable ring in the illustrated embodiment, in other embodiments, other suitable surface(s) (e.g., formed on anti-rotation plate(s), formed within the housing, etc.) and/or device(s) (e.g., protrusion(s)/recess(es), pin(s), fastener(s), etc.) may be used to block rotation of at least one non-rotatable ring (e.g., alone or in combination with the substantially flat surface(s)).

In the illustrated embodiment, the first rotatable ring 44 includes two engagement features (e.g., first engagement features), the second rotatable ring 46 includes two engagement features (e.g., second engagement features), the first drive plate 52 includes two engagement features (e.g., second engagement features, third engagement features), and the second drive plate 54 includes two engagement features (e.g., fourth engagement features). As illustrated, with the ball 26 in the illustrated closed position, one engagement feature 66 of the first drive plate 52 is in contact with a corresponding engagement feature 68 of the first rotatable ring 44, and another engagement feature 70 of the first drive plate 52 is in contact with a corresponding engagement feature 72 of the second rotatable ring 46. The ball 26 may rotate in a first rotational direction 74 about the rotational axis 32 from the open position toward the illustrated closed position. As the ball 26 approaches the closed position, the engagement feature 66 of the first drive plate 52 engages the corresponding engagement feature 68 of the first rotatable ring 44, and the engagement feature 70 of the first drive plate 52 engages the corresponding engagement feature 72 of the second rotatable ring 46. Further rotation of the ball 26 in the first rotational direction 74 causes the first drive plate 52 to drive the rotatable rings to rotate about the longitudinal axis 42 via engagement of the engagement features of the first drive plate 52 and the rotatable rings. Rotation of the first rotatable ring 44 from a first position (e.g., in which the engagement features of the first drive plate and the first rotatable ring are not engaged with one another) to a second position (e.g., in which the first rotatable ring is rotated about the longitudinal axis) causes the respective bearing element(s) to drive the first rotatable ring 44 and the first non-rotatable ring 48 away from one another along the longitudinal axis 42, thereby compressing the first annular seat 38 against the ball 26. In addition, rotation of the second rotatable ring 46 from a first position (e.g., in which the engagement features of the first drive plate and the second rotatable ring are not engaged with one another) to a second position (e.g., in which the second rotatable ring is rotated about the longitudinal axis) causes the respective bearing element(s) to drive the second rotatable ring 46 and the second non-rotatable ring 50 away from one another along the longitudinal axis 42, thereby compressing the second annular seat 40 against the ball 26. Accordingly, as the ball rotates to the closed position, each annular seat is compressed against the ball by mechanical force applied by the first drive plate, the rotatable rings, and the bearing elements (e.g., alone or in combination with a force applied by pressurized fluid within the ball valve assembly, as discussed in detail below). As a result, each annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seats are compressed against the ball by application of fluid pressure alone.

Figure 4:
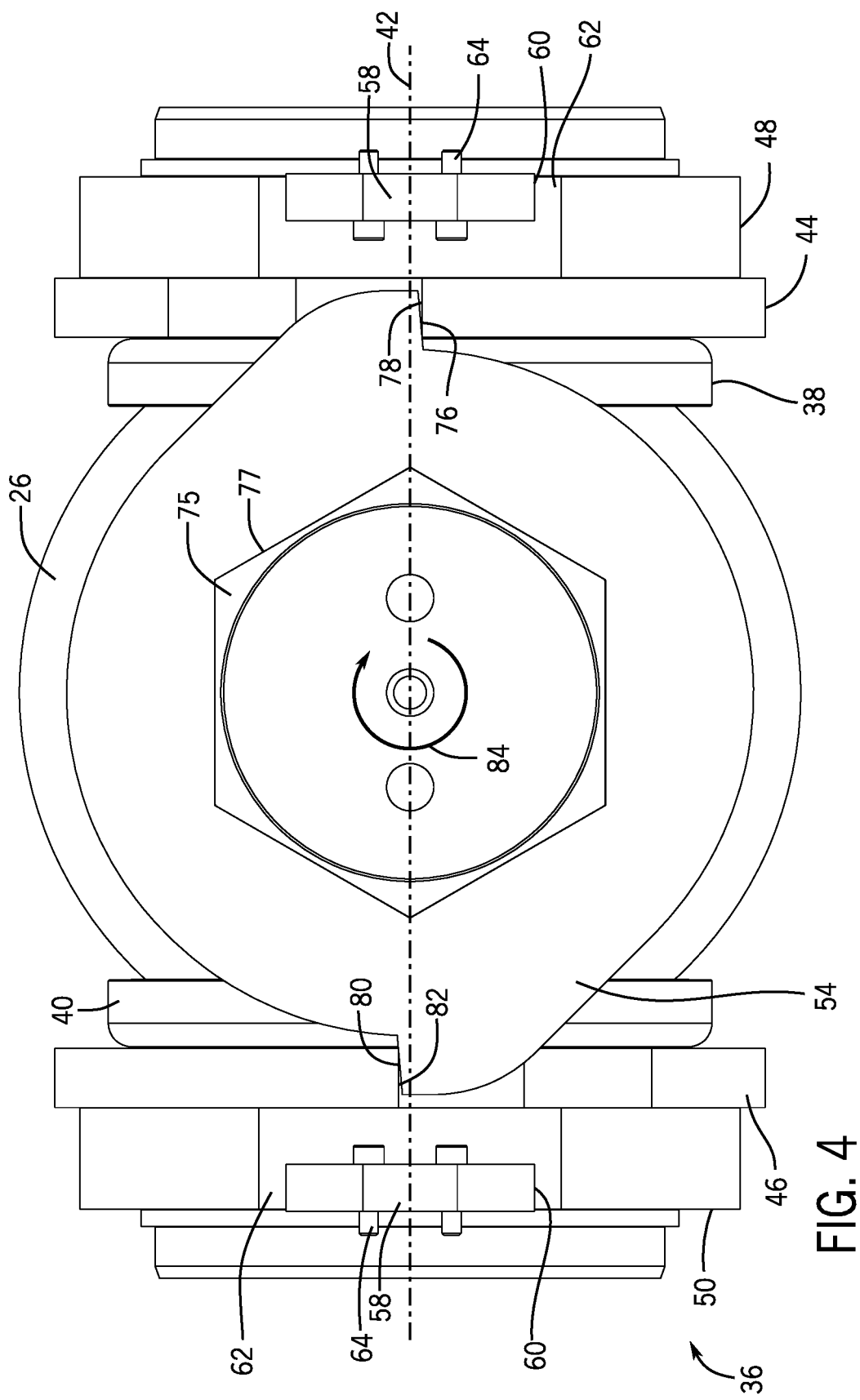
FIG. 4 is a bottom view of the ball and the sealing system of FIG. 3, in which the ball is in an open position.

FIG. 4 is a bottom view of the ball 26 and the sealing system 36 of FIG. 3, in which the ball 26 is in an open position. In the illustrated embodiment, the ball 26 includes a second polygonal protrusion 75, and the second drive plate 54 includes a corresponding polygonal recess 77 (e.g., opening) configure to receive the second polygonal protrusion 75 of the ball 26. Engagement of the second polygonal protrusion 75 of the ball 26 with the corresponding polygonal recess 77 of the second drive plate 54 non-rotatably couples the second drive plate 54 to the ball 26. While the second protrusion and the corresponding recess are polygonal in the illustrated embodiment, in other embodiments, the protrusion and the corresponding recess may have any other suitable shape (e.g., elliptical, star-shaped, etc.). Furthermore, in certain embodiments, the second drive plate may be non-rotatably coupled to the ball by another suitable connection (e.g., alone or in combination with the protrusion/recess connection), such as a fastener connection, a welded connection, an adhesive connection, other suitable connection(s), or a combination thereof.

As illustrated, with the ball 26 in the illustrated open position, one engagement feature 76 of the second drive plate 54 is in contact with a corresponding engagement feature 78 of the first rotatable ring 44, and another engagement feature 80 of the second drive plate 54 is in contact with a corresponding engagement feature 82 of the second rotatable ring 46. The ball 26 may rotate in a second rotational direction 84 about the rotational axis from the closed position toward the illustrated open position. As the ball 26 approaches the open position, the engagement feature 76 of the second drive plate 54 engages the corresponding engagement feature 78 of the first rotatable ring 44, and the engagement feature 80 of the second drive plate 54 engages the corresponding engagement feature 82 of the second rotatable ring 46. Further rotation of the ball 26 in the second rotational direction 84 causes the second drive plate 54 to drive the rotatable rings to rotate about the longitudinal axis 42 via engagement of the engagement features of the second drive plate 54 and the rotatable rings. Rotation of the first rotatable ring 44 from a first position (e.g., in which the engagement features of the second drive plate and the first rotatable ring are not engaged with one another) to a second position (e.g., in which the first rotatable ring is rotated about the longitudinal axis) causes the respective bearing element(s) to drive the first rotatable ring 44 and the first non-rotatable ring 48 away from one another along the longitudinal axis 42, thereby compressing the first annular seat 38 against the ball 26. In addition, rotation of the second rotatable ring 46 from a first position (e.g., in which the engagement features of the second drive plate and the second rotatable ring are not engaged with one another) to a second position (e.g., in which the second rotatable ring is rotated about the longitudinal axis) causes the respective bearing element(s) to drive the second rotatable ring 46 and the second non-rotatable ring 50 away from one another along the longitudinal axis 42, thereby compressing the second annular seat 40 against the ball 26. Accordingly, as the ball rotates to the open position, each annular seat is compressed against the ball by mechanical force applied by the second drive plate, the rotatable rings, and the bearing elements (e.g., alone or in combination with a force applied by pressurized fluid within the ball valve assembly, as discussed in detail below). As a result, each annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seats are compressed against the ball by application of fluid pressure alone.

In the illustrated embodiment, each engagement feature includes a substantially flat surface configured to engage the substantially flat surface of a corresponding engagement feature. For example, in certain embodiments, the substantially flat surface of each engagement feature may be angled (e.g., about 1 degree to about 10 degrees, about 2 degrees to about 7 degrees, or about 5 degrees) relative to a radial axis of the respective ring/plate to facilitate engagement of the respective engagement features. While each engagement feature includes a substantially flat surface in the illustrated embodiment, in other embodiments, at least one engagement feature may include another suitable surface and/or device (e.g., rounded surface, protrusion configured to engage a recess, etc.) configured to engage a corresponding engagement feature.

While the non-rotatable rings are configured to move along the longitudinal axis in the illustrated embodiment, in other embodiments, movement of at least one non-rotatable ring along the longitudinal axis may be blocked. In such embodiments, the bearing element(s) may drive the respective rotatable ring(s) away from the respective non-rotatable ring(s) along the longitudinal axis in response to rotation of the rotatable ring(s). Furthermore, while each non-rotatable ring is positioned on an opposite side of the respective rotatable ring from the respective annular seat in the illustrated embodiment, in other embodiments, at least one non-rotatable ring may be positioned between the respective annular seat and the respective rotatable ring. In addition, as previously discussed, in the illustrated embodiment, the first drive plate 52 and the rotatable rings are configured such that the first drive plate 52 drives the rotatable rings to rotate as the ball 26 approaches the closed position, and the second drive plate 54 and the rotatable rings are configured such that the second drive plate 54 drives the rotatable rings to rotate as the ball 26 approaches the open position. However, in other embodiments, the first drive plate and the rotatable rings may be configured such that the first drive plate drives the rotatable rings to rotate as the ball approaches the open position, and the second drive plate and the rotatable rings may be configured such that the second drive plate drives the rotatable rings to rotate as the ball approaches the closed position. Furthermore, in certain embodiments, one of the drive plates may be omitted. In such embodiments, the rotatable rings may only be driven to rotate as the ball approaches the closed position or the open position. In addition, in certain embodiments, the sealing system may include two driving plates that cooperate to drive the rotatable rings to rotate (e.g., as the ball approaches the closed position or the open position). Furthermore, while the sealing system includes two annular seats, two rotatable rings, and two non-rotatable rings in the illustrated embodiment, in other embodiments, the sealing system may include a single annular seat, rotatable ring, and non-rotatable ring. In such embodiments, only one annular seat may be compressed against the ball by mechanical force, and each driving plate may only include a single engagement feature.

Figure 5:
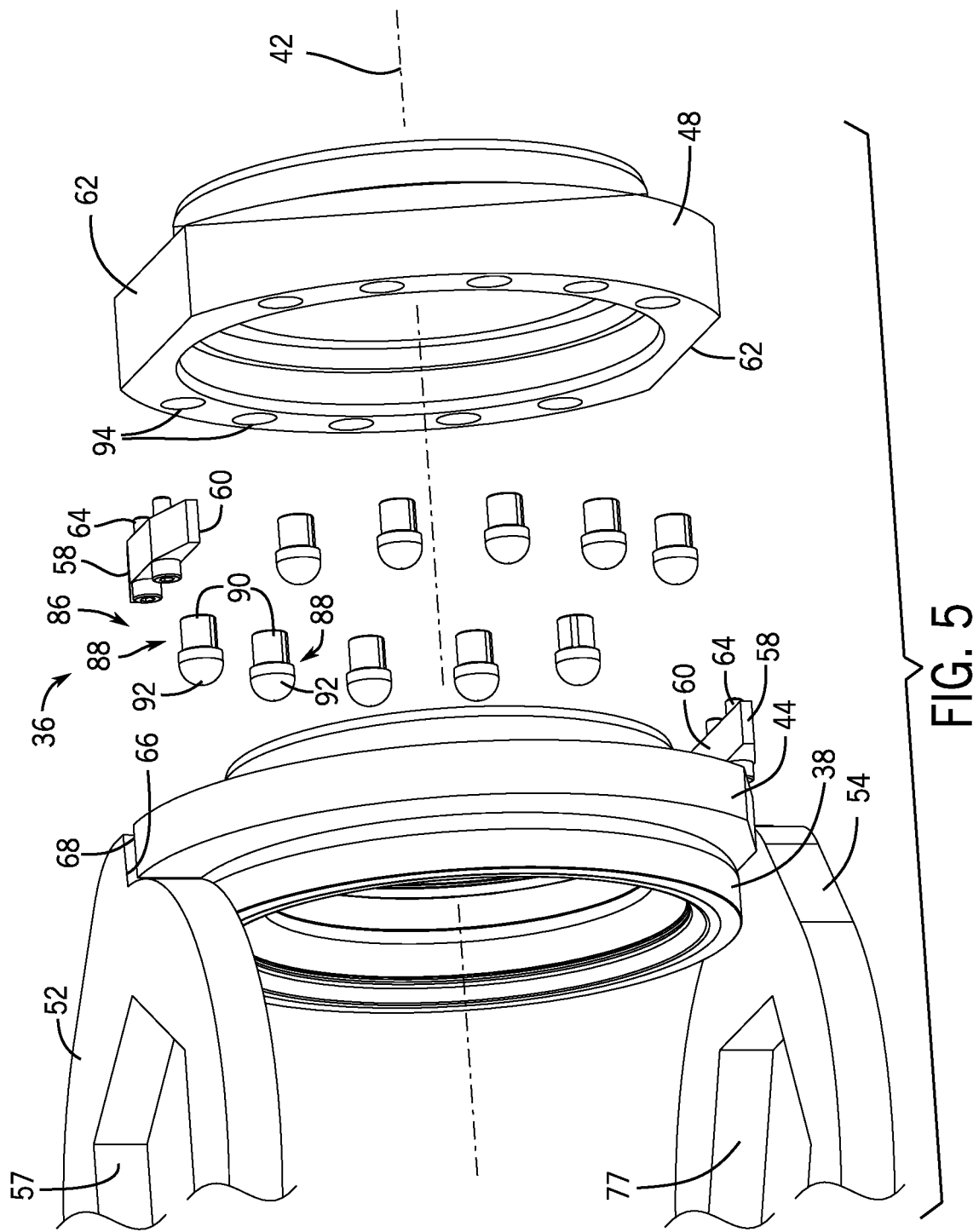
FIG. 5 is an exploded view of a portion of the sealing system of FIG. 3.

FIG. 5 is an exploded view of a portion of the sealing system 36 of FIG. 3. As previously discussed, the sealing system 36 includes bearing element(s) 86 configured to drive the first rotatable ring 44 and the first non-rotatable ring 48 away from one another to compress the first annular seat 38 against the ball 26 in response to rotation of the first rotatable ring 44. In the illustrated embodiment, the bearing elements 86 include spherical head pins 88. Each spherical head pin 88 includes a shaft 90 and a hemi-spherical head 92. The shaft 90 of each spherical head pin 88 is configured to be disposed within a corresponding recess 94 of the first non-rotatable ring 48. In the illustrated embodiment, each spherical head pin 88 is coupled to the first non-rotatable ring 48 via an interference fit between the shaft 90 of the spherical head pin 88 and the corresponding recess 94. However, in other embodiments, at least one spherical head pin may be coupled to the first non-rotatable ring by another suitable connection (e.g., a threaded connection, a welded connection, a pinned connection, an adhesive connection, a shrink-fit connection, etc.).

Furthermore, as discussed in detail below, the hemi-spherical head 92 of each spherical head pin 88 is configured to selectively engage a respective recess within the first rotatable ring 44. While the hemi-spherical heads 92 of the spherical head pins 88 are engaged with the respective recesses of the first rotatable ring 44, the first rotatable ring 44 and the first non-rotatable ring 48 may be positioned a minimum distance away from one another along the longitudinal axis 42 (e.g., touching one another, separated by a small gap, etc.). In response to rotation of the first rotatable ring 44 from the first position to the second position, the hemi-spherical heads 92 of the spherical head pins 88 disengage the respective recesses of the first rotatable ring 44, thereby driving the first rotatable ring 44 and the first non-rotatable ring 48 away from one another along the longitudinal axis 42. As used herein, "away from one another" refers to increasing the distance between the rotatable and non-rotatable rings and does not necessarily include movement of both rings (e.g., in embodiments in which movement of the non-rotatable ring along the longitudinal axis is blocked).

As previously discussed, in the illustrated embodiment, each spherical head pin 88 is coupled to the first non-rotatable ring 48, and each respective recess is formed within the first rotatable ring 44. However, in other embodiments, at least one spherical head pin may be coupled to the first rotatable ring, and at least one respective recess may be formed within the first non-rotatable ring. In addition, while the bearing elements 86 include spherical head pins 88 in the illustrated embodiment, in other embodiments, the bearing elements may include any other suitable type(s) of bearing element(s) (e.g., alone or in combination with the spherical head pin(s)), such as ball bearing(s) (e.g., captured by at least one of the rings), wedge(s) (e.g., formed on at least one of the rings), roller(s) (e.g., captured by at least one of the rings), other suitable type(s) of bearing element(s), or a combination thereof. Furthermore, in the illustrated embodiment, the sealing system 36 includes ten bearing elements 86 disposed circumferentially about the longitudinal axis 42 (e.g., flow path through the ball valve assembly). However, in other embodiments, the sealing system may include more or fewer bearing elements (e.g., 1, 2, 4, 6, 8, 12, 14, 20, or more) arranged in any suitable configuration. While first bearing element(s) configured to drive the first rotatable ring and the first non-rotatable ring away from one another are disclosed above, in certain embodiments, the sealing system may include second bearing element(s) configured to drive the second rotatable ring and the second non-rotatable ring away from one another. Such second bearing element(s) may include any of the features and/or variations disclosed herein with regard to the first bearing element(s). In addition, the first and second bearing elements may be the same as one another or different from one another.

Figure 6:
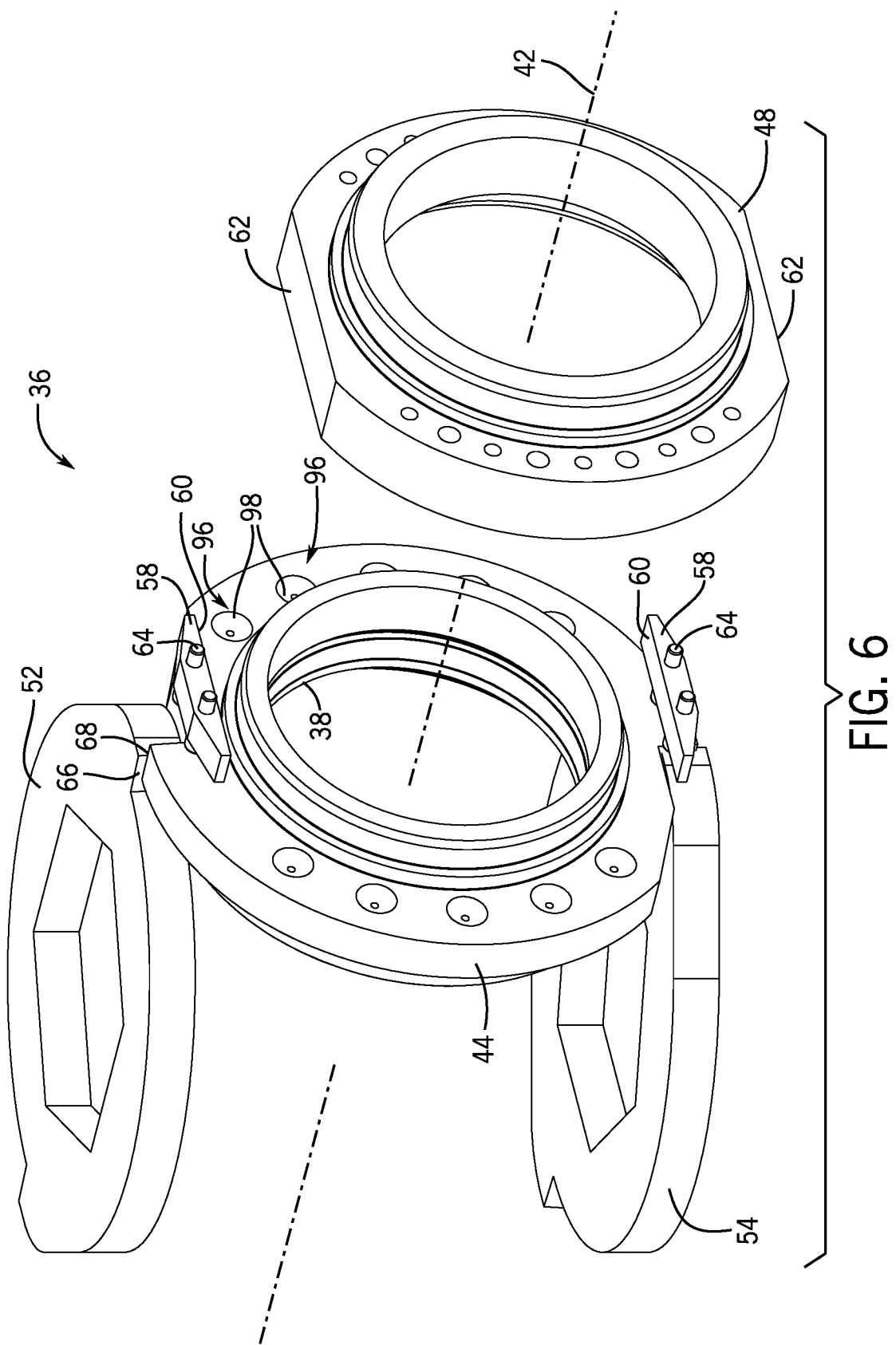
FIG. 6 is another exploded view of a portion of the sealing system of FIG. 3.

FIG. 6 is another exploded view of a portion of the sealing system 36 of FIG. 3. As previously discussed, in the illustrated embodiment, recesses 96 are formed within the first rotatable ring 44. Each recess 96 is configured to receive a respective bearing element (e.g., spherical head pin). In the illustrated embodiment, each recess 96 has a substantially conical shape (e.g., with straight walls, with curved walls, etc.). However, in other embodiments, at least one recess may have another suitable shape (e.g., hemi-spherical, polygonal, etc.). The shape of each recess is configured to receive a respective bearing element while the bearing element is aligned with the recess. Accordingly, while the first rotatable ring 44 is in the first position, the bearing elements are engaged with/disposed within the respective recesses 96, thereby establishing the minimum separate distance between the first rotatable ring 44 and the first non-rotatable ring 48. In addition, the shape of each recess wall 98 is configure to drive the rotatable and non-rotatable rings away from one another in response to movement that offsets the recess from the respective bearing element. For example, in response to rotation of the first rotatable ring 44 to the second position, each bearing element may disengage the respective recess 96 (e.g., while maintaining contact with the wall 98 of the recess 96). Accordingly, as the first rotatable ring 44 rotates toward the second position, the bearing elements disengage the respective recesses 96, thereby separating the first rotatable ring 44 from the first non-rotatable ring 48, which compresses the first annular seat 38 against the ball. As used herein with respect to the bearing elements/recesses, "disengage"/"disengaged" refers to a bearing element that is not fully engaged with the respective recess. Accordingly, a disengaged bearing element includes a bearing element that is partially disengaged from the respective recess (e.g., in which the bearing element maintains contact with the wall of the recess) and a bearing element that is fully disengaged from the respective recess (e.g., in which the bearing element is in contact with the surface of the rotatable ring surrounding the recess).

Figure 7:
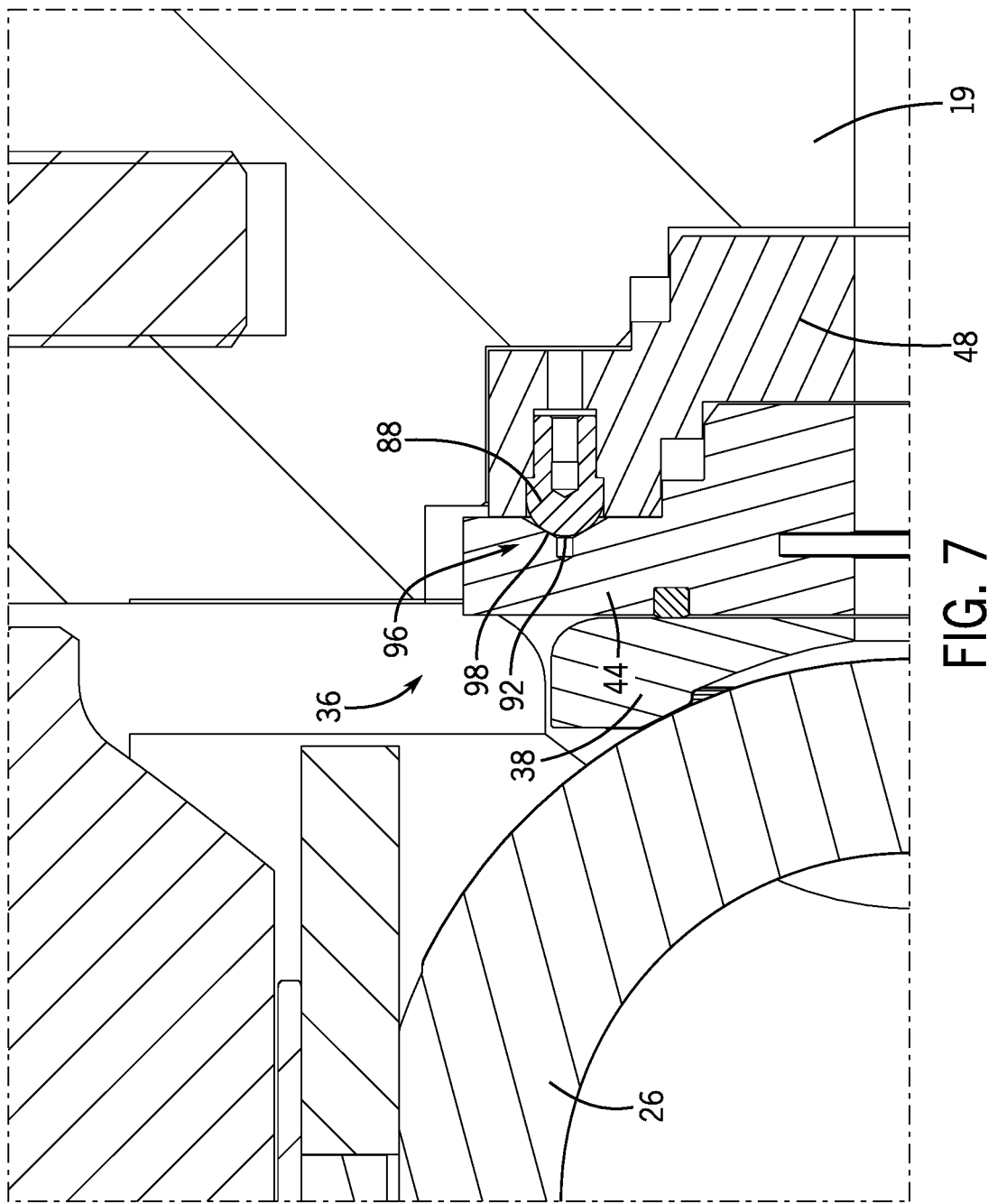
FIG. 7 is a cross-sectional view of a portion of the sealing system of FIG. 3, in which a spherical head pin is engaged with a respective recess.

FIG. 7 is a cross-sectional view of a portion of the sealing system 36 of FIG. 3, in which a spherical head pin 88 is engaged with a respective recess 96. While the hemi-spherical head 92 of each spherical head pin 88 is engaged with a respective recess 96 of the first rotatable ring 44, the first rotatable ring 44 and the first non-rotatable ring 48 are positioned a minimum distance away from one another along the longitudinal axis (e.g., touching one another, separated by a small gap, etc.). In response to rotation of the first rotatable ring 44 from the first position to the second position, the hemi-spherical head 92 of each spherical head pin 88 disengages the respective recess 96 of the first rotatable ring 44, thereby driving the first rotatable ring 44 and the first non-rotatable ring 48 away from one another along the longitudinal axis.

Figure 8:
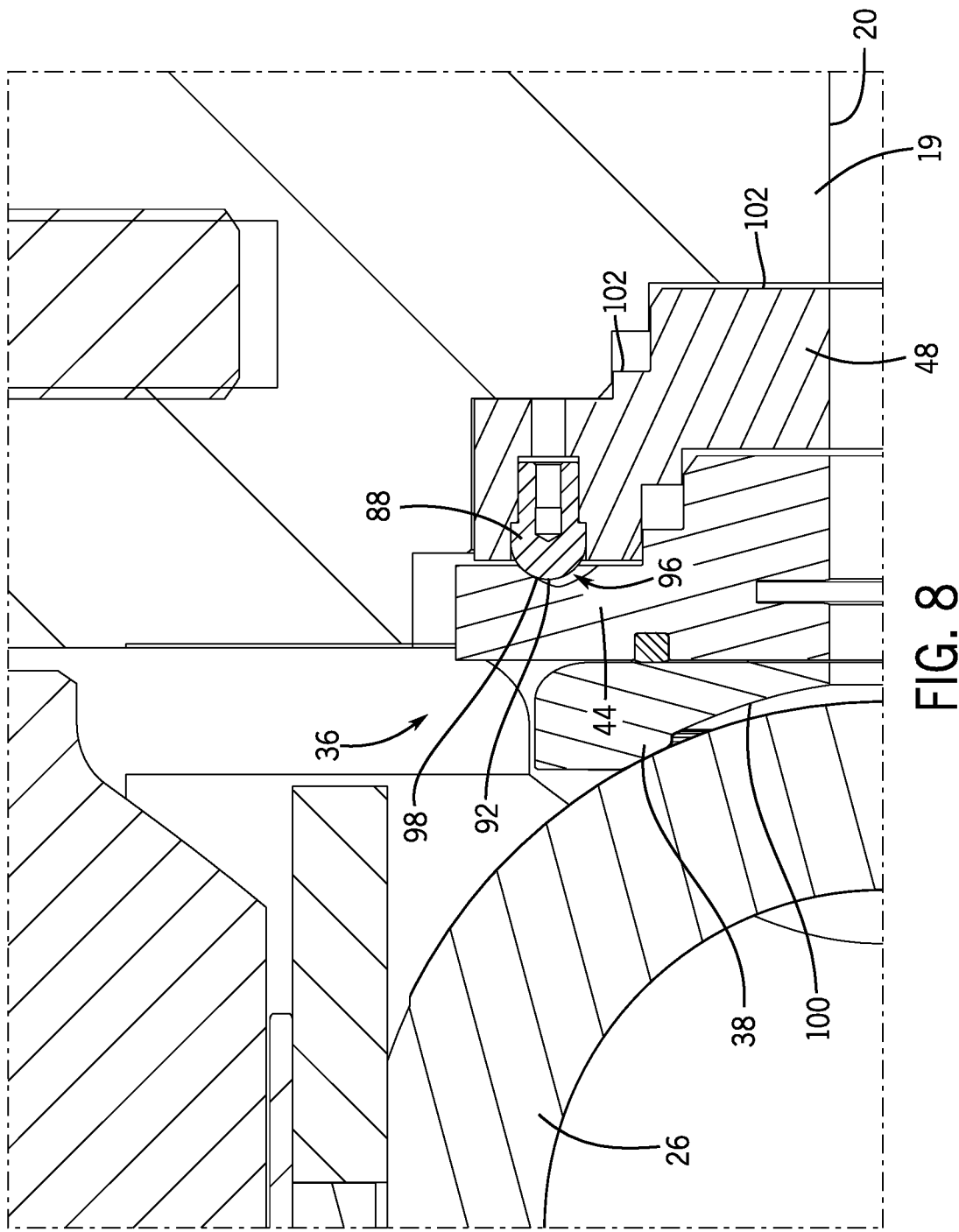
FIG. 8 is a cross-sectional view of a portion of the sealing system of FIG. 3, in which the spherical head pin is disengaged from the respective recess.

FIG. 8 is a cross-sectional view of a portion of the sealing system 36 of FIG. 3, in which the spherical head pin 88 is disengaged from the respective recess 96. As previously discussed, in response to rotation of the first rotatable ring 44 to the second position, each spherical head pin 88 disengages the respective recess 96. Accordingly, as the first rotatable ring 44 rotates toward the second position, the spherical head pins 88 disengage the respective recesses 96, thereby driving the first rotatable ring 44 and the first non-rotatable ring 48 away from one another, which compresses the first annular seat 38 against the ball. Accordingly, as the ball rotates to the open or the closed position, each annular seat is compressed against the ball by mechanical force applied by the first/second drive plate, the rotatable ring(s), and the bearing element(s) (e.g., alone or in combination with a force applied by pressurized fluid within the ball valve assembly, as discussed in detail below). As a result, each annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seats are compressed against the ball by application of fluid pressure alone.

Furthermore, in the illustrated embodiment, the hemi-spherical head 92 of each spherical head pin 88 maintains contact with the wall 98 of the respective recess 96 while the first rotatable ring 44 is in the second position. Due to the shape of the wall 98 of each recess 96, the respective spherical head pin 88 may be urged into engagement with the recess 96 while the hemi-spherical head 92 of the spherical head pin 88 is in contact with the wall 98 of the recess 96. Accordingly, as the ball 26 rotates away from the open position or the closed position and the engagement features disengage one another, contact between the spherical head pins 88 and the recesses 96 may drive the first rotatable ring 44 to rotate from the second position to the first position. However, in other embodiments, the bearing element(s) may contact the surface surrounding the recess(es) while the rotatable ring is in the second position, or the wall of each recess may be shaped to block re-engagement of the respective bearing element with the recess. In such embodiments, the bearing element(s) may remain disengaged from the respective recess(es) as the ball rotates away from the open/closed position and the engagement features disengaged one another.

While utilizing mechanical force to compress each annular seat is disclosed above, in certain embodiments, the ball valve assembly may utilize a combination of mechanical and hydraulic force to compress at least one annular seat against the ball. For example, in the illustrated embodiment, fluid within the fluid passage 20 may urge the first annular seat 38, the first rotatable ring 44, and the first non-rotatable ring 48 away from the ball via application of pressure to a first area 100 of the first annular seat 38. As illustrated, the first area 100 of the first annular seat 38 corresponds to the portion of the first annular seat 38 that faces the ball and is positioned radially inward from the portion of the first annular seat 38 that contacts the ball. In addition, the fluid within the fluid passage 20 may urge the first annular seat 38, the first rotatable ring 44, and the first non-rotatable ring 48 toward the ball via application of pressure to a second area 102 of the first non-rotatable ring 48. As illustrated, the second area 102 of the first non-rotatable ring 48 corresponds to the portion of the first non-rotatable ring 48 that faces away from the ball and is positioned radially inward from the portion of the first non-rotatable ring 48 that contacts the housing 19. In the illustrated embodiment, the second area 102 is greater than the first area 100. Accordingly, a net force is applied to the first annular seat 38, the first rotatable ring 44, and the first non-rotatable ring 48 in a direction toward the ball, thereby further compressing the first annular seat 38 against the ball while the ball is in the open or closed position. While the hydraulic force is disclosed above with regard to the first annular seat 38, the hydraulic force may be additionally or alternatively used to compress the second annular seat against the ball.

Additionally or alternatively, the sealing system may include spring(s) (e.g., coil spring(s), leaf spring(s), etc.) configured to urge at least one annular seat/rotatable ring/non-rotatable ring toward the ball. For example, in certain embodiments, one or more springs may be positioned between the housing and at least one respective non-rotatable ring. The spring(s) enable movement of the annular seat(s), the rotatable ring(s), and the non-rotatable ring(s) to facilitate insertion of the ball during assembly of the ball valve assembly. In addition, the spring(s) urge the bearing element(s) into engagement with the respective recess(es). For example, in embodiments including spherical head pin(s), the force of the spring(s) may urge the hemi-spherical head of each spherical head pin to move along the wall of the respective recess until the spherical head pin is engaged (e.g., fully engaged) with the respective recess. Technical effects of the disclosure include compressing an annular seat of a ball valve assembly with increased force to enable the ball valve assembly to be used for additional applications. For example, as previously discussed, rotation of the rotatable ring causes the bearing element(s) to drive the rotatable ring and the non-rotatable ring away from one another, thereby compressing the annular seat against the ball. Accordingly, as the ball rotates to the open position or to the closed position, the annular seat is compressed against the ball by mechanical force applied by the drive plate, the rotatable ring, and the bearing element(s) (e.g., alone or in combination with a force applied by pressurized fluid within the ball valve assembly). As a result, the annular seat may be compressed with significantly more force than an annular seat in a ball valve assembly that uses fluid pressure alone to compress the annular seat against the ball. Therefore, the ball valve assembly disclosed herein may be used for applications having operational conditions that are unsuitable for a ball valve assembly in which the annular seat is compressed against the ball by application of fluid pressure alone.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ball valve assembly, comprising:
   a ball configured to rotate between an open position and a closed position;
   an annular seat configured to engage the ball;
   a rotatable ring positioned on an opposite side of the annular seat from the ball, wherein the rotatable ring comprises at least one first engagement feature;
   a non-rotatable ring positioned adjacent to the rotatable ring;
   a drive plate non-rotatably coupled to the ball, wherein the drive plate is configured to rotate with the ball, the drive plate comprises at least one second engagement feature, and the at least one second engagement feature of the drive plate is configured to engage the at least one first engagement feature of the rotatable ring to drive the rotatable ring to rotate in response to rotation of the drive plate;
   a second drive plate non-rotatably coupled to the ball, wherein the second drive plate is configured to rotate with the ball, the second drive plate comprises at least one third engagement feature, the at least one first engagement feature of the rotatable ring comprises a plurality of first engagement features, and the at least one third engagement feature of the second drive plate is configured to engage one first engagement feature of the plurality of first engagement features of the rotatable ring to drive the rotatable ring to rotate in response to rotation of the second drive plate; and
   at least one bearing element configured to drive the rotatable ring and the non-rotatable ring away from one another to compress the annular seat against the ball in response to rotation of the rotatable ring.

2. The ball valve assembly of claim 1, wherein the at least one bearing element comprises a spherical head pin configured to selectively engage a respective recess, and the spherical head pin is configured to disengage the respective recess in response to rotation of the rotatable ring to drive the rotatable ring and the non-rotatable ring away from one another.

3. The ball valve assembly of claim 2, wherein the spherical head pin is coupled to the non-rotatable ring, and the respective recess is formed within the rotatable ring.

4. The ball valve assembly of claim 1, wherein the at least one bearing element comprises a plurality of bearing elements disposed circumferentially about a flow path through the ball valve assembly.

5. The ball valve assembly of claim 4, wherein each bearing element of the plurality of bearing elements comprises a spherical head pin.

6. The ball valve assembly of claim 1, further comprising an anti-rotation plate, wherein the non-rotatable ring comprises a first substantially flat surface, the anti-rotation plate comprises a second substantially flat surface, and the second substantially flat surface is configured to engage the first substantially flat surface to block rotation of the non-rotatable ring.

7. The ball valve assembly of claim 1, wherein the at least one first engagement feature of the rotatable ring comprises a first substantially flat surface, and the at least one second engagement feature of the drive plate comprises a second substantially flat surface.

8. A ball valve assembly, comprising:
a housing having a fluid passage;
a ball disposed within the housing and comprising a fluid pathway, wherein the ball is configured to rotate between an open position and a closed position, the fluid pathway of the ball is configured to align with the fluid passage of the housing while the ball is in the open position to enable fluid flow through the fluid passage, and the fluid pathway of the ball is configured to be offset from the fluid passage of the housing while the ball is in the closed position to substantially block fluid flow through the fluid passage;
an annular seat configured to engage the ball, wherein the annular seat is substantially aligned with the fluid passage of the housing;
a rotatable ring positioned on an opposite side of the annular seat from the ball along a longitudinal axis of the fluid passage, wherein the rotatable ring is configured to rotate about the longitudinal axis of the fluid passage, and the rotatable ring comprises at least one first engagement feature;
a non-rotatable ring positioned adjacent to the rotatable ring, wherein rotation of the non-rotatable ring about the longitudinal axis of the fluid passage is blocked;
a drive plate non-rotatably coupled to the ball, wherein the drive plate is configured to rotate with the ball, the drive plate comprises at least one second engagement feature, and the at least one second engagement feature of the drive plate is configured to engage the at least one first engagement feature of the rotatable ring to drive the rotatable ring to rotate from a first position to a second position in response to rotation of the drive plate;
a second drive plate non-rotatably coupled to the ball, wherein the second drive plate is configured to rotate with the ball, the second drive plate comprises at least one third engagement feature, the at least one first engagement feature of the rotatable ring comprises a plurality of first engagement features, and the at least one third engagement feature of the second drive plate is configured to engage one first engagement feature of the plurality of first engagement features of the rotatable ring to drive the rotatable ring to rotate from the first position to the second position in response to rotation of the second drive plate; and
at least one bearing element configured to drive the rotatable ring and the non-rotatable ring away from one another to compress the annular seat against the ball in response to rotation of the rotatable ring toward the second position.

9. The ball valve assembly of claim 8, wherein the at least one bearing element comprises a spherical head pin configured to engage a respective recess while the rotatable ring is in the first position and to disengage the respective recess while the rotatable ring is in the second position.

10. The ball valve assembly of claim 9, wherein the spherical head pin is coupled to the non-rotatable ring, and the respective recess is formed within the rotatable ring.

11. The ball valve assembly of claim 8, wherein the at least one bearing element comprises a plurality of bearing elements disposed circumferentially about the fluid passage.

12. The ball valve assembly of claim 8, further comprising an anti-rotation plate, wherein the non-rotatable ring comprises a first substantially flat surface, the anti-rotation plate comprises a second substantially flat surface, and the second substantially flat surface is configured to engage the first substantially flat surface to block rotation of the non-rotatable ring about the longitudinal axis of the fluid passage.

13. The ball valve assembly of claim 8, wherein the at least one first engagement feature of the rotatable ring comprises a first substantially flat surface, and the at least one second engagement feature of the drive plate comprises a second substantially flat surface.

14. A ball valve assembly, comprising:
a ball configured to rotate between an open position and a closed position;
a first annular seat configured to engage a first side of the ball;
a second annular seat configured to engage a second side of the ball, opposite the first side of the ball;
a first rotatable ring positioned on an opposite side of the first annular seat from the ball, wherein the first rotatable ring comprises at least one first engagement feature;
a second rotatable ring positioned on an opposite side of the second annular seat from the ball, wherein the second rotatable ring comprises at least one second engagement feature;
a first non-rotatable ring positioned adjacent to the first rotatable ring;
a second non-rotatable ring positioned adjacent to the second rotatable ring;
a drive plate non-rotatably coupled to the ball, wherein the drive plate is configured to rotate with the ball, the drive plate comprises a plurality of third engagement features, one of the plurality of third engagement features of the drive plate is configured to engage the at least one first engagement feature of the first rotatable ring to drive the first rotatable ring to rotate in response to rotation of the drive plate, and another of the plurality of third engagement features of the drive plate is configured to engage the at least one second engagement feature of the second rotatable ring to drive the second rotatable ring to rotate in response to rotation of the drive plate;
a second drive plate non-rotatably coupled to the ball, wherein the second drive plate is configured to rotate with the ball, the second drive plate comprises a plurality of fourth engagement features, the at least one first engagement feature of the first rotatable ring comprises a plurality of first engagement features, the at least one second engagement feature of the second rotatable ring comprises a plurality of second engagement features, one of the plurality of fourth engagement features of the second drive plate is configured to engage one first engagement feature of the plurality of first engagement features of the first rotatable ring to drive the first rotatable ring to rotate in response to rotation of the second drive plate, and another of the plurality of fourth engagement features of the second drive plate is configured to engage one second engagement feature of the plurality of second engagement features of the second rotatable ring to drive the second rotatable ring to rotate in response to rotation of the second drive plate;
at least one first bearing element configured to drive the first rotatable ring and the first non-rotatable ring away from one another to compress the first annular seat against the ball in response to rotation of the first rotatable ring; and
at least one second bearing element configured to drive the second rotatable ring and the second non-rotatable ring away from one another to compress the second annular seat against the ball in response to rotation of the second rotatable ring.

15. The ball valve assembly of claim 14, wherein the at least one first bearing element comprises a first spherical head pin configured to selectively engage a respective first recess, and the first spherical head pin is configured to disengage the respective first recess in response to rotation of the first rotatable ring to drive the first rotatable ring and the first non-rotatable ring away from one another; and wherein the at least one second bearing element comprises a second spherical head pin configured to selectively engage a respective second recess, and the second spherical head pin is configured to disengage the respective second recess in response to rotation of the second rotatable ring to drive the second rotatable ring and the second non-rotatable ring away from one another.

16. The ball valve assembly of claim 15, wherein the first spherical head pin is coupled to the first non-rotatable ring, the respective first recess is formed within the first rotatable ring, the second spherical head pin is coupled to the second non-rotatable ring, and the respective second recess is formed within the second rotatable ring.

17. The ball valve assembly of claim 14, further comprising:

a first anti-rotation plate, wherein the first non-rotatable ring comprises a first substantially flat surface, the first anti-rotation plate comprises a second substantially flat surface, and the second substantially flat surface is configured to engage the first substantially flat surface to block rotation of the first non-rotatable ring; and a second anti-rotation plate, wherein the second non-rotatable ring comprises a third substantially flat surface, the second anti-rotation plate comprises a fourth substantially flat surface, and the fourth substantially flat surface is configured to engage the third substantially flat surface to block rotation of the second non-rotatable ring.

* * * * *